INVENTORS
Karl Hoyer
Alfred Ortlieb by Michael J Striker
Atty

INVENTORS
Karl Hoyer
Alfred Ortlieb by Michael J. Striker
Attorney

INVENTORS
Karl Hoyer
Alfred Ortlieb
by Michael S. Striker
Attorney

United States Patent Office 3,446,943
Patented May 27, 1969

3,446,943
INFORMATION STORING APPARATUS
Karl Hoyer, Leinfelden, Wurttemberg, and Alfred Ortlieb, Stuttgart-Vaihingen, Germany, assignors to Robert Bosch G.m.b.H., Stuttgart, Germany
Filed June 1, 1965, Ser. No. 460,257
Claims priority, application Germany, June 4, 1964, B 77,085
Int. Cl. G06k 1/12, 3/00; G01d 15/06
U.S. Cl. 235—61.9 4 Claims

ABSTRACT OF THE DISCLOSURE

A record carrier having a burnable layer is transported under burner electrodes representing characters. Manually operated members representing the same characters operate control switches connected with the burner electrodes so that the same burn areas into the layer in different patterns for representing selected characters. Readout elements arranged in the pattern of the burner electrodes sense the pattern of the burnt areas and produce control signal for actuating printing or copying means to print the respective characters.

The present invention relates to an information storing apparatus, and more particularly to an information storing and retrieving apparatus for storing on a record carrier information in a random sequence, and for retrieving a particular stored information by identifying a specific control mark provided on the record carrier and associated with the respective information.

Apparatus of this type is known, and serves the purpose to record and retrieve information, for example citations of literature. Each citation is provided with identifying data which characterize the contents of the citation.

Known apparatus serving this purpose uses magnetic record carriers, or perforated tape, which has certain disadvantages. It is difficult to store a great amount of different pieces of information within a small area without causing mistakes when the information is read out.

Wide magnetic tape which is frequently used in apparatus of this type, not only requires extensive recording and read out devices, but it is also difficult to provide means for checking the correctness of the stored information.

It is one object of the invention to overcome these disadvantages of known information storing and retrieving apparatus, and to provide apparatus in which the information is stored in the form of burnt areas of a burnable layer of a record carrier.

Another object of the invention is to provide a storing and retrieving apparatus permitting the storing of information in legible form.

Another object of the invention is to use electrodes for burning areas of the record carrier to provide identifying data, and to use burner electrodes also for burning identifying data in legible form into the record carrier.

A particular advantage of the recording of the information and of identifying data by burning areas of the record carrier to form an identifying pattern, is that by burning of a thin layer, the mechanical strength of the record carrier is not impaired, so that the record carrier can be constructed as a thin paper band provided with a metallic burnable layer.

In machines of the type with which the present invention is concerned, it is immaterial that recorded information represented by burnt areas cannot be erased, as is possible with magnetic recordings, since an information which is no longer required, can be skipped during the retrieving operation under the control of a specific mark on the record carrier.

One embodiment of the invention comprises supporting means and transporting means for a record carrier having a thin burnable layer; a set of burner electrodes positioned to cooperate with different areas of the burnable layer; and a set of manually controlled members respectively representing different characters or symbols and respectively connected by circuit means and switches with the burner electrodes. Upon actuation of the selected manually controlled member, the respective burner electrode is energized to burn a corresponding area of the layer so that the location of the burnt area represents the selected character or symbol.

In the preferred embodiment of the invention, a series of sets of burner electrodes respecticely representing the same set of characters or symbols is provided. The set of electrodes are disposed in parallel rows extending in the longitudinal direction of a record carrier band, and series of corresponding electrodes of the sets are disposed in rows transverse to the record carrier band. Manual control means are provided for starting transporting means which transport the record carrier band which is moved a given distance corresponding to the length of the rows of electrodes. This is accomplished by the control means which cause energization of control electrodes which burn control areas into the layer of the record carrier band, and by sensing the control areas by means which stop the transporting means after the same has moved the record carrier band to place an unused section of the record carrier band under the electrodes.

For retrieving information, read out means including photocells and printing means are provided. The photocells can be rendered operative in accordance with a selected pattern for sensing burnt areas arranged in the same pattern on the record carrier band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 4:
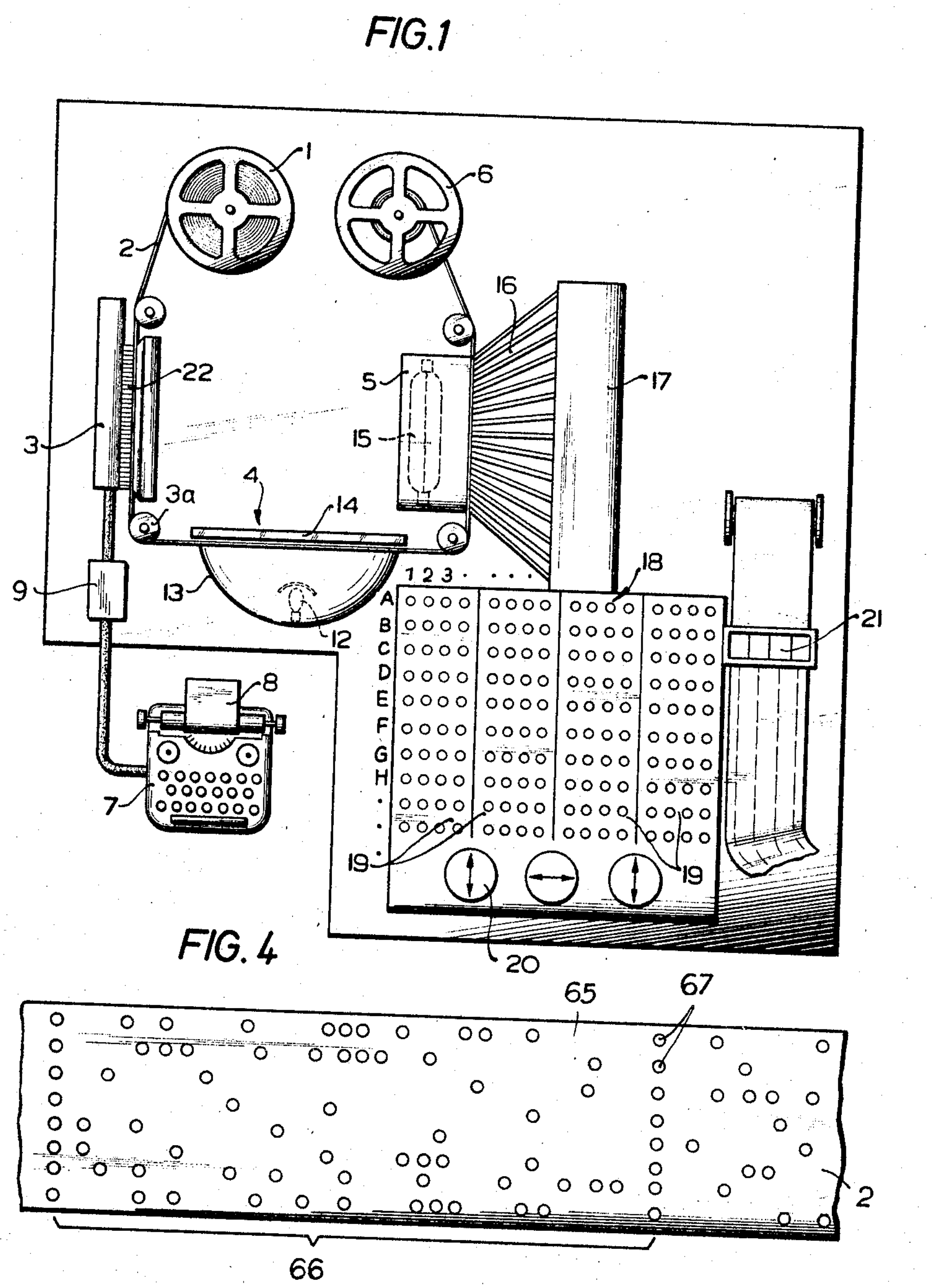
FIG. 1 is a fragmentary schematic view illustrating an apparatus of the invention.
Figures 2, 2A, 3, 5:
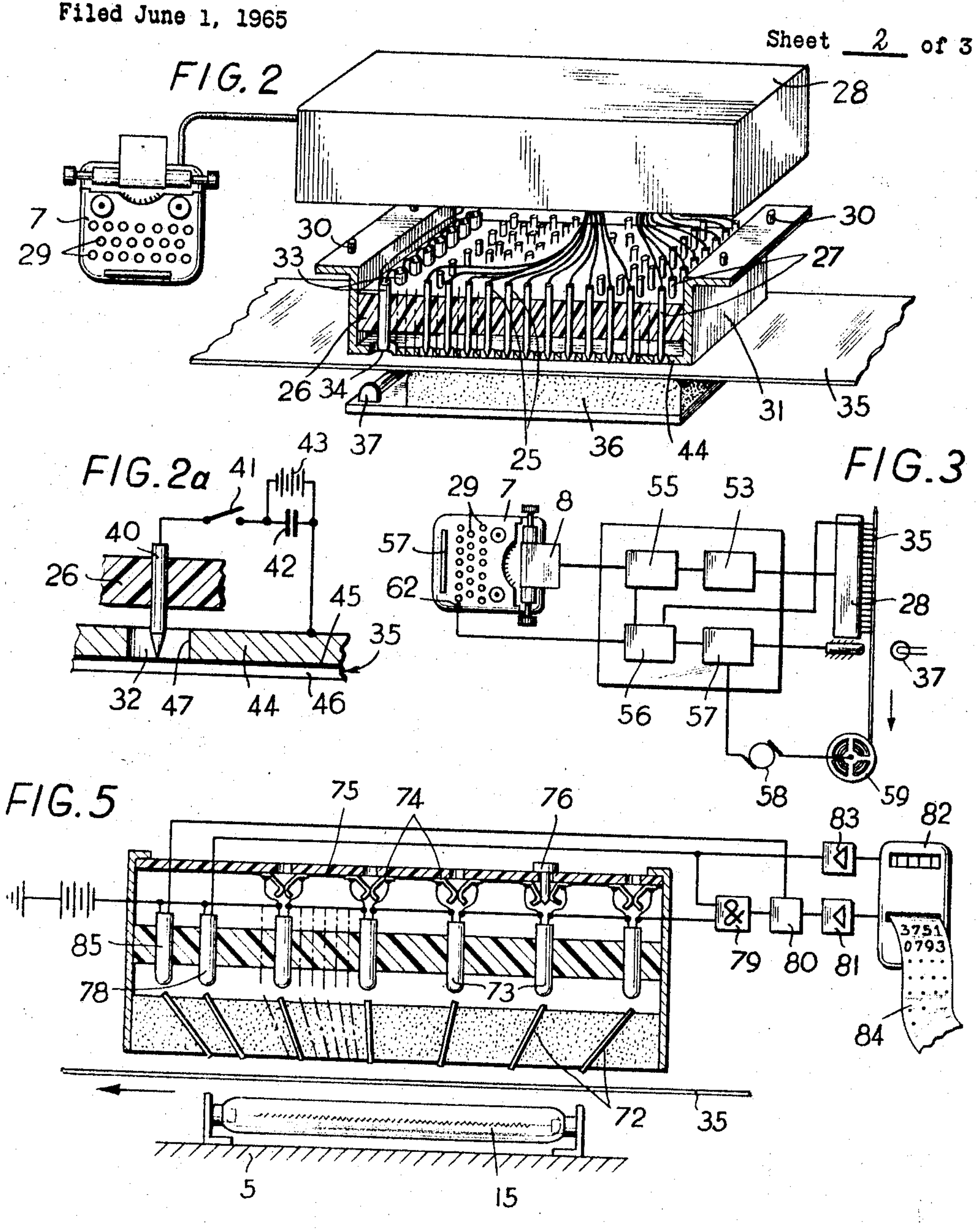
FIG. 2 is a fragmentary diagrammatic exploded partially sectional view of the recording apparatus used in the embodiment of FIG. 1.
Figure 5A:
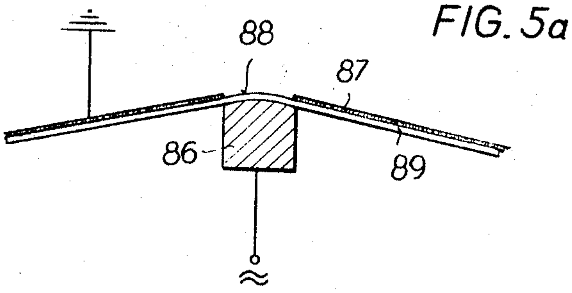
Figure 6:
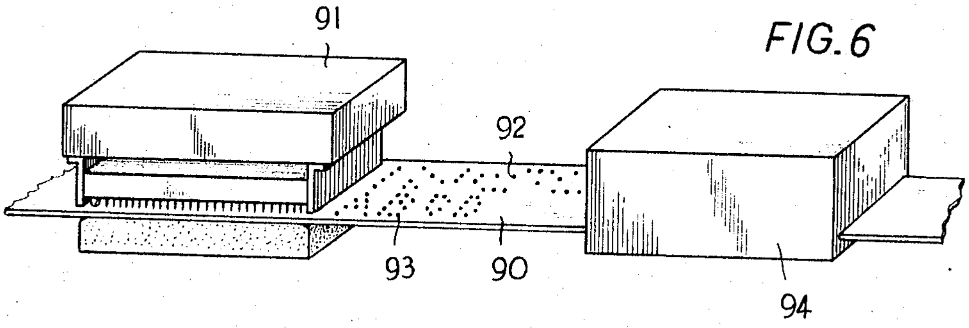

FIG. 2*a* is a fragmentary vertical sectional view illustrating a detail of the recording device shown in FIG. 2;

FIG. 3 is a diagrammatic view illustrating the electric circuit of the recording device;

FIG. 4 illustrates a section of a record carrier with recordings in the form of burnt areas produced by the recording device of FIGS. 2 and 3;

FIG. 5 is a fragmentary schematic, partially sectional view combined with a circuit diagram and illustrating a read out device for retrieving information stored by the recording device, and for printing the retrieved information;

FIG. 5a is a fragmentary schematic sectional view illustrating a modified part of the read out device; and FIG. 6 is a fragmentary perspective view illustrating a recording device for recording information in legible form, and a device for producing copies of the legible information.

Referring now to the drawings, and more particularly to FIG. 1, a record carrier 2 composed of a paper band and a thin burnable metallic layer thereon is taken off a supply reel 1 and is wound up on a take-up reel 6. The record carrier 2 passes through a recording device 3 provided with burner electrodes 22 which are selectively energized to burn areas 65 of the metal layer of the record carrier in a pattern representing information. Control electrodes produce the transverse rows of burnt areas 67 which are made to separate sections of the record carrier having a length 66 and containing a specific piece of retrievable information.

The record carrier passes through a viewing device 4 including a source of light 12, and a mirror 13 arranged to reflect the pattern of the burnt areas 65 onto a transparent or translucent viewing plate 14 so that the recorded pattern can be checked, for example by holding a sheet having perforations according to the desired pattern against the viewing plate 14.

The record carrier passes then through a read out device 5 including a source of light 15, light conductive elements 16, and a retrieving device 17, and finally to the take-up reel 6. A comparison device 18 causes printing by printing means 21 when a section of the record carrier having burnt areas in a specific pattern characterizing a particular information is located in the read out device. Several comparison elements 19 may be used for programming different characteristic patterns so that any one of several information-containing sections of the record carrier will be retrieved and read out. However, by operation of switching devices 20, the retrieving can be carried out in such a manner that the retrieved information is characterized by data programmed on two or more comparison elements 19.

The recording device 3 is controlled by a typewriter mechanism 7 which during the typing of information on a file card 8, also controls a switching device 9 by which the recording device 3, and more particular the burner electrodes 22 are selectively energized for burning areas 65 of the layer of the record carrier band. Transporting roller means 3a are stopped during the recording operation so that the burnt areas 65 are accurately positioned.

For recording the information and characteristic data in coded form on the record carrier, any code may be selected in accordance with the purpose of the apparatus, the amount of each piece of information to be recorded, and the number of characteristic data, but for each piece of information sections of the record carrier of equal length must be used. After the information and characteristic data have been recorded on a section of the record carrier, a manual control member is actuated, and the record carrier is transported a distance corresponding to the length of a section 66. The viewing device 4 is arranged spaced from the recording device 3 such a distance that when transporting rollers 3a stop, a section of the record carrier is located in the viewing device and can be checked.

Transporting rollers 5a transport the band continuously through the read out device 5.

If the printing out of information by printer 21 takes longer than the reading out of the characteristic data, it is advantageous to provide separate read out devices for the characteristic data and for the information. A comparison device stops the record carrier, or reduces its speed so that the switching operations are finished when the information to be read out arrives at the respective read out device which requires that the read out device for the information is arranged a predetermined distance in the direction of movement of the record carrier behind the read out device of the characteristic data.

A more economic use of the record carrier band, and a simpler construction of the machine can be obtained by providing instead of characteristic data and information, characteristic data with a counting mark so that during reading out of the information, the counting marks operate a counter. In this event, the printer prints only the current number of the piece of information whose characteristic data correspond to the programmed characteristic data. In a following operation, the respective numbers are used for finding correspondingly numbered file cards containing excerpts, the names of authors, and other data of retrieved information.

The preferred construction of the recording device 3 will now be explained with reference to FIGS. 2, 2a and 3. A series of eight sets or rows of burner electrodes 25 is provided. Each row of electrodes 25 consists of twenty-six electrodes corresponding to the letters of the alphabet, eleven only of the electrodes 25 are drawn in full lines and fifteen are represented by dash and dotted lines. The electrodes are mounted in an insulating plate 26 which is secured to a brass frame 31 having two lateral portions and a bottom plate 44 in which eight rows of perforations 32 are provided. The inner surfaces 47 of perforations 32 are spaced from the points 40 of electrodes 25, as shown in FIG. 2a.

In addition to the electrodes 25, a series of eight control electrodes 27 extending transverse to the record carrier 35 and to the rows of electrodes 25 is provided. The points of control electrodes 27 are also located in corresponding perforations of bottom plate 44, and all points of the electrodes are in close proximity with the metallic burnable layer 45 which is secured to the paper band 46 of the record carrier 35.

At the left end of frame 31, a transverse row of photo diodes 33 is mounted in support plate 26 in a position projecting into a corresponding row of perforations 34 of bottom plate 44. A source of light 37 is located on the other side of record carrier 35 and extends along the row of perforations 34 and photo diodes 33. Consequently, when a transverse row of burnt areas 67, as shown in FIG. 4, is located between the source of light 37 and the photo diodes 33, all photo diodes will be excited. Electrodes 25 and 27 and photo diodes 33 are connected with a switch device 28 including a capacitor 42 and a switch 41 for each electrode. As shown in FIG. 2a, a source of voltage 43 is connected to capacitor 42 for charging the same so that upon closing of a switch 41, the respective electrode 25, 40 will be energized since the other plate of capacitor 42 is connected with the brass bottom plate 44. The circuit is closed through the metallic layer 45 which has a thickness of 0.1 micron so that an arc develops between the point of the energized electrode and the inner surface 47 of the perforation causing burning of a corresponding circular area of the metallic layer 45. The voltage of the voltage source 43 may be 900 volts.

Switches 41 are controlled by the manually operated keys 29 of the typewriter mechanism 7. Switching device 28 is shown in raised condition in FIG. 2, and has bores engaged by pins 30 when the casing of switching device 28 is placed on the flanges of frame 31. The diameter of perforations 32 is preferably 2 mm., and the electrodes 25, 27 have a diameter of 0.8 mm. A cushion 36 is pressed by a plate against the paper band 46 so that the metallic layer 45 is pressed against the bottom plate 44 of frame 31 in a position assuring a reliable operation of the electrodes. The source of light 37 is secured to the same support plate.

The control of switching device 28 by the typewriter 7 will be best understood with reference to FIG. 3. The typewriter produces under control of keys 29 a legible text on the file card 8. The text contains words or data characteristic of a citation or piece of information.

When the key 29 correlated with the first character, letter or symbol of the respective characteristic word or data is operated, a switching means 53 receives an impulse which causes closing of switch 41 correlated with the electrode 25 which represents the same letter or character of the alphabet which is associated with the actuated key 29.

At the same time, the impulse received from the typewriter actuates a line switching means 55 to cause supply of the impulse produced by the actuation of the next following typewriter key 29, to the next following series of switches 41 and energization of a selected burner electrode 25 of the second row. In this manner, the first eight characters, letters or symbols of a characterizing word or of a characteristic data are marked on the record carrier 35 by a burnt area of the metallic layer 45. Each successive key actuation causes the energization of an electrode 25 of successive rows of electrodes 25, and the position of the electrode in the respective row is determined by the letter, character or symbol selected by the operator and represented by the actuated key 29.

After the eighth character or symbol, the recording device is automatically disconnected.

In order to obtain a recording of the next characteristic word or data, the space bar 57 of the typewriter is actuated which causes an impulse to the switching means 55 connecting against the first row of electrodes into the circuit. The second characteristic data is typed on the typewriter, and selected electrodes of the eight rows of electrodes 25 are successively energized to burn areas into the same section of the record carrier 35, since the record carrier is at a standstill. A number of characteristic words or data are thus superimposed in coded form on the same section of the record carrier, and several burnt out areas are made along eight rows corresponding to the rows of electrodes 25.

Additional information is typed on the file card 8 without being recorded on the record carrier, and a current number is given to each file card for identifying the respective information.

Thereupon, a control key 62 is actuated which provides an impulse for a switching means 56. Switching means 56 is part of control means which perform several functions. First, the control electrodes 27 are energized so that a transverse row of eight burnt areas 67 is formed on the metal layer of the record carrier. This complete series of burnt area 67 serves as a starting, stopping and counting mark. At the same time, switching means 55 receives an impulse by which it is returned to the initial position connecting the first row of electrodes 25 into the circuit. Furthermore, a switching means 57 receives an impulse which actuates switching means 57 to connect a motor 58 to a voltage source so that the motor drives a transporting roller 59, corresponding to transporting roller 3*a* or take-up reel 6 of FIG. 1. When the series of stop marks 67 arrives under the photocells 33, light from the source of light 37 passes through all burnt areas 67, which are transparent since the metal layer has been burnt off, and the photocells are energized. When all photocells are energized, an impulse is produced which controls switching means 57 to stop motor 58 so that the record carrier is stopped after having moved a distance corresponding to the length of a section 66 in FIG. 4, and to the length of the rows of electrodes 25 and 27.

A read out and retrieving device according to the invention is illustrated in FIG. 5. The record carrier 35 is continuously transported past a source of light 15. Light conductive elongated elements 72 are arranged in the same pattern as the electrodes 25 in the recording device in eight parallel rows, but having closer spaced ends in the region of the source of light 15 and farther spaced ends remote from the source of light and respectively located opposite photo diodes 73. A switch 74 is connected in parallel to each photo diode 73 which are connected in series. Switch 74 can be opened by insertion of an insulating plug 76. Switches 74 and plug 76 are mounted on an insulating support plate 75 of the casing which envelopes the photo diodes and the light conductors. By insertion of plugs 76, selected photo diodes 73 of each row are rendered operative, and when burnt areas of the record carrier arranged in the same pattern are located between the source of light 15 and the light conductive element 72, the respective twenty-six photo diodes 73 in each of the eight rows are energized and produce an impulse. Five only of the photo diodes 73 are drawn in full lines and twenty-one are represented by dash and dotted lines.

The control marks or areas 67 are sensed by eight photo diodes 78 which are arranged in a transverse row across the record carrier and are connected in series. When a control mark consisting of eight burnt areas 67 is sensed by photo diodes 78, an impulse is supplied to an "AND" switch 79 and to an amplifier 83 which supplies an amplified impulse to the counter of a printing impulse counter 82 so that the impulse shifts the counter to the next following position.

When at this moment photo diodes 73 rendered operative by plug 76 to receive light through corresponding burnt transparent areas of the record carrier 35, another impulse is given to the "AND" switch 79 so that the same, having received the second impulse, supplies an impulse to a clearing means 80 and an amplifier 81 which causes actuation of the printing device of the impulse counter 82.

The characteristic word or number, or other characteristic data is printed by the printer on a paper tape 84, and a corresponding file card containing all the necessary information associated with the respective control data and carrying the control data or control number, can be easily found.

If some stored information, recorded on a file card, is no longer required, the respective section 66 of the record carrier is provided with a burnt out mark or area which is sensed by a photo diode 85 which produces an impulse supplied to the clearing means 80 and cancelling the impulse provided by the "AND" switch 79 so that the respective characteristic number or data is not printed.

In the above described embodiments, photocells are used for sensing the pattern of the burnt out areas on the record carrier. In the modification illustrated in FIG. 5*a*, each photo diode is replaced by a capacitor. The record carrier 89 is transported in the direction of the arrow over an electrode 86 which is connected to a high frequency alternating current. The metal layer 87 of the record carrier 89 is connected to mass. When a burnt area 88 passes electrode 86, the capacity of the capacitor formed by elements 86 and 87 is varied, and consequently the current flowing through electrode 86 is varied, and this variation of the current can be measured and utilized for identifying and reading out the characteristic data.

In a modified arrangement, only the characteristic data are recorded in coded form as burnt areas, while the respective piece of information is recorded in legible form on the record carrier. This substantially facilitates the viewing of the recorded information, and the reading out. When a specific piece of information is to be retrieved, the legible information can be read and checked by the operator at the read out device, and particularly valuable information selected for printing or for copying. Such an arrangement is shown in FIG. 6 to include recording device 91 including electrodes, as described above for burning areas 92 in accordance with a code into the metal layer of the record carrier 90. At the same time, other burner electrodes are energized at selected time intervals and for selected time periods to burn areas of the metal layer which together form legible letters 93. The letters 93 appearing in the lower part of the record carrier, are then copied in a copying device 94 so that no printer is required.

It will be understood that each of the elements described above, or two or more together, may also find a useful application in other types of information storing and retrieving apparatus differing from the types described above.

While the invention has been illustrated and described as embodied in an information storing apparatus including burner electrodes for recording on a record carrier having a burnable layer coded information in the form of burnt areas, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Information storing and retrieving apparatus comprising, in combination, transporting means for transporting an elongated record carrier band in longitudinal direction thereof, said record carrier band having a thin burnable layer; electrode means including a series of sets of burner electrodes respectively representing the same set of characters or symbols and positioned to cooperate with different areas of said layer, said sets of electrodes being disposed in parallel rows extending in the longitudinal direction of said record carrier band, and series of corresponding electrodes of said sets being disposed in rows transverse to said direction; circuit means including a voltage source and a series of sets of switch means respectively connected with said burner electrodes, and switching means for connecting said sets of switch means successively into the circuit; a set of manually controlled members representing said set of characters and symbols and respectively connecting with said switch means, and controlling said switching means so that upon successive actuation of selected manually controlled members, the respective selected burner electrodes of said sets are successively energized to burn corresponding areas of said layer so that the locations of a series of burnt areas represent a series of characters or symbols; read out means including a source of light on one side of said record carrier band, and on the other side of said band a series of rows of elements arranged in the pattern of said burner electrodes each element including a photocell and a switch manually operable for setting the respective photocell according to a program between an inoperative condition, and an operative condition so that a selected series of operative photocells represents a desired information, said series of operative photocells responding only to a corresponding pattern of said burnt areas to produce a control signal; and means controlled by said control signal to perceptibly represent the information.

2. Information storing and retrieving apparatus comprising, in combination, transporting means for transporting an elongated record carrier band in longitudinal direction thereof, said record carrier band having a thin burnable layer; electrode means including a series of sets of first burner electrodes respectively representing the same set of characters or symbols and positioned to cooperate with different areas of said layer, said sets of electrodes being disposed in parallel rows extending in the longitudinal direction of said record carrier band, and series of corresponding electrodes of said sets being disposed in rows transverse to said direction, and a transverse row of second writing burner electrodes; circuit means including a voltage source and a series of sets of switch means respectively connected with said burner electrodes, other switches connected with said writing burner electrodes, and switching means for connecting said sets of switch means successively into the circuit; a set of manually controlled members representing said set of characters and symbols and respectively connected with said switch means, and controlling said switching means so that upon successive actuation of selected manually controlled members, the respective selected first burner electrodes of said sets are successively energized to burn corresponding areas of said layer so that the locations of a series of burnt areas represent a series of characters or symbols in coded form, while said second writing burner electrodes burn areas in said layer forming the outline of said characters or symbols; manual control means for said transporting means; read out means including a series of rows of elements arranged in the pattern of said burner electrodes, each element being operable according to a program between an inoperative condition, and an operative condition so that a selected series of operative elements represents a desired information, said series of operative elements responding only to a corresponding pattern of said burnt areas to produce a control signal; and means controlled by said control signal to perceptibly represent the information, and including copying means for copying from said record carrier said outlines of said characters or symbols.

3. An apparatus as set forth in claim 2 wherein each said elements includes a conductive member on the side of said record carrier band remote from said layer and forming with the same a capacitor whose capacity varies in the region of said burnt areas.

4. Information storing and retrieving apparatus comprising, in combination, transporting means for transporting an elongated record carrier paper band in longitudinal direction thereof, said record carrier band having a thin burnable metallic layer; electrode means including a series of sets of burner electrodes respectively representing the same set of characters or symbols and positioned to cooperate with different areas of said layer, said sets of electrodes being disposed in parallel rows extending a given distance in the longitudinal direction of said record carrier band, and series of corresponding electrodes of said sets being disposed in rows transverse to said direction and a series of control burner electrodes respectively located at the ends of said rows and forming a transverse row; circuit means including a voltage source and a series of sets of switch means respectively connected with said burner electrodes, switching means for connecting said sets of switch means successively into the circuit and capacitors discharged by said switch means to energize correlated burner electrodes to form an arc on said metallic layer whereby an area of the same is burnt; a typewriter for typing a legible text and including a set of manually controlled keys representing said set of characters and symbols and respectively connected with said switch means, and controlling said switching means so that upon successive actuation of selected manually controlled members, the respective selected burner electrodes of said sets are successively energized to burn corresponding areas of said layer so that the locations of a series of burnt areas represent a series of characters or symbols; control means including a manual control key for starting said transporting means and connected with said circuit means to energize all said burner electrodes simultaneously whereby a transverse row of control areas is burnt in said record carrier band; photoelectric sensing means for sensing said burnt control areas and connected with said transporting means for stopping the same after the same has moved said record carrier band said given distance; read out means including a series of rows of elements arranged in the pattern of said burner electrodes, each element being operable according to a program between an inoperative condition, and an operative condition so that a selected series of operative elements represents a desired information, said series of operative elements responding only to a corresponding pattern of said burnt areas to produce a control signal; and means controlled by said control signal to perceptibly represent the information.

References Cited

UNITED STATES PATENTS

| | | | |
|---|---|---|---|
| 1,138,089 | 5/1915 | Crumpton | 235—61.91 |
| 2,595,889 | 5/1952 | Ryffel et al. | 235—61.1 |
| 2,737,882 | 3/1956 | Early et al. | 346—745 |
| 2,938,666 | 5/1960 | Rand | 235—61.115 |
| 3,023,952 | 3/1962 | Thomas | 235—61.1 |
| 3,035,764 | 5/1962 | Beman | 235—61.9 |
| 3,043,505 | 7/1962 | Brown | 235—61.116 |
| 3,044,694 | 7/1962 | Davidson et al. | 235—61.116 |
| 3,074,066 | 1/1963 | Conerly | 346—745 |
| 3,175,763 | 3/1965 | Gotz et al. | 235—61.1 |
| 3,183,518 | 5/1965 | Henry et al. | 235—61.12 X |

MAYNARD R. WILBUR, *Primary Examiner.*

ROBERT M. KILGORE, *Assistant Examiner.*

U.S. Cl. X.R.

101—19; 346—74